United States Patent [19]

Ring

[11] 4,228,690

[45] Oct. 21, 1980

[54] DRIVE AND CLUTCH FOR A TIMING MECHANISM

[75] Inventor: Thomas F. Ring, Indianapolis, Ind.

[73] Assignee: Emhart Industries, Inc., Indianapolis, Ind.

[21] Appl. No.: 64,029

[22] Filed: Aug. 6, 1979

[51] Int. Cl.³ .............................................. F16H 27/04

[52] U.S. Cl. ..................................... 74/122; 74/568 T

[58] Field of Search ................................. 74/116–119, 74/122–125, 125.5, 568 T, 578; 188/82.7, 82.77; 200/38 B, 38 BA, 38 C, 38 CA

[56] References Cited

U.S. PATENT DOCUMENTS

| | | | |
|---|---|---|---|
| 2,256,466 | 9/1941 | Cullin | 74/116 |
| 3,156,123 | 11/1964 | Denny | 74/116 X |
| 3,626,117 | 12/1971 | Stafford | 74/125 X |
| 3,857,293 | 12/1974 | Godwin et al. | 74/125 |
| 4,125,074 | 11/1978 | Sato | 188/82.7 |

*Primary Examiner*—Lawrence J. Staab

*Attorney, Agent, or Firm*—Robert F. Meyer; David W. Gomes

[57] ABSTRACT

A pair of ratchets are coupled to a camstack with each rachet being driven by a separate drive pawl. A no back clutch, that is associated with the camstack to prevent its reversal during its advancement, comprises an annular member having a multiplicity of individual pawls engaging a multi-tooth ratchet coupled to the camstack. A spring biased lever and a spring biased actuator coupled to the lever engages one of the drive pawls so that the drive pawl can be disengaged from its ratchet for at least a portion of a program cycle.

8 Claims, 7 Drawing Figures

DRIVE AND CLUTCH FOR A TIMING MECHANISM

BACKGROUND OF THE INVENTION

This is a substitute application for application Ser. No. 904,818 filed May 11, 1978, now abandoned.

Generally speaking, the present invention pertains to a timing mechanism wherein a cam means is rotatably driven by power drive means through an improved intermittent drive means, the improved intermittent drive means comprising first and second ratchet means coupled to the cam means, first and second drive pawls coupled to the power drive means engaging the first and second ratchet means respectively, and a no back clutch operably associated with the cam means preventing reversal thereof during its engagement.

The present invention pertains to timing mechanisms and more particularly to a drive and clutch means for intermittently rotating its cam means.

Timing mechanisms find great use in applicances such as washers, dryers, and dishwashers. Such mechanisms usually include a camstack, the cams of which engage electrical switches to open and close them in accordance with a program determined by the cams, a power drive means, and a means coupling the power drive means to the camstack. In most cases, the coupling means is an intermittent drive means or escapement.

As such appliances become more complicated due to the different materials being washed and dried, the programs and thus the timing mechanisms become more complicated. It thus becomes an ever increasing problem to find ways and means to provide more programs with more precise control of events, and usually within a limited space.

Another problem associated with such mechanisms is that of the intermittent drive means or the escapement itself. Usually the intermittent drive means include rathet and pawl arrangements wherein a back up or no back pawl prevents or at least limits the back lash of the camstack as it is intermittently advanced by the drive pawl. While in most cases the use of a no back pawl is satisfactory, in most cases there is undesirable reversing capability due to the "lag" in the back up pawl engaging a tooth.

OBJECTS OR FEATURES OF THE INVENTION

It is, therefore, a feature of the invention to provide a timing mechanism having a means to provide an almost infinite number of timing cycles. It is another feature of the invention to provide such a timing mechanism having a cam means, two ratchet means coupled to the cam means, and two separate drive pawls, one each engaging a single ratchet means. Another feature of the invention is the provision of such a timing mechanism wherein a no back clutch is provided to prevent or at least limit reversal of the cam means advancement. Yet another feature of the invention is the provision of such a timing mechanism wherein such no back clutch includes an annular member having a multiplicity of individual pawls engaging a multi-tooth ratchet. Still another feature of the invention is the provision of such a timing mechanism wherein such no back clutch includes an annular member carried by the cam means and wherein the multi-tooth ratchet includes internal teeth carried by the cam means. Another feature of the invention is the provision of such a timing mechanism wherein a disengaging means is provided to disengage at least one of the drive pawls from its ratchet means. Another feature of the invention is the provision of such a timing mechanism wherein the disengaging means includes a spring biased lever and a spring biased actuator coupled to the lever and engaging the drive pawl. These and other features of the invention will become apparent from the following description taken in conjunction with the accompanying drawings.

DESCRIPTION OF A PREFERRED EMBODIMENT OF THE INVENTION

Figure 1:
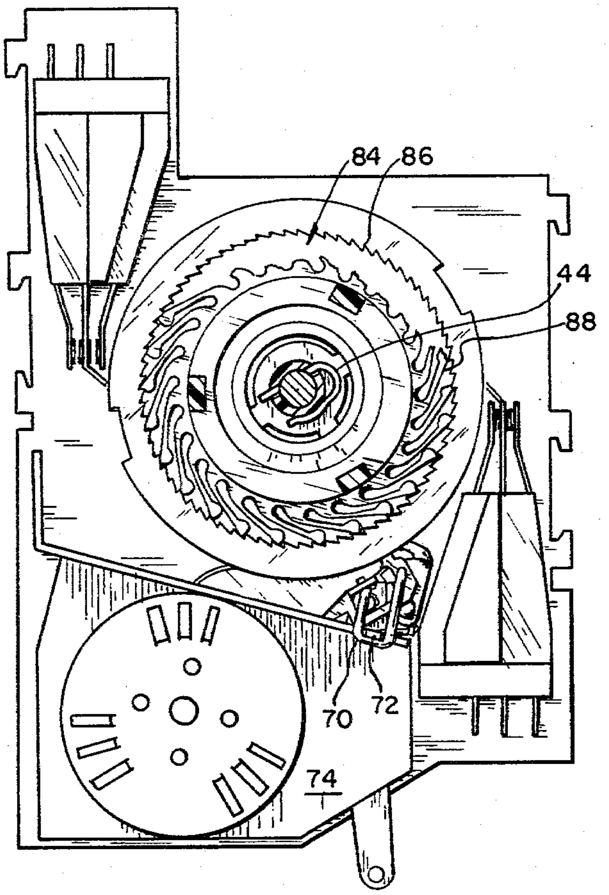
FIG. 1 is a top view of a timing mechanism with portions removed showing features of the invention.
Figure 2:
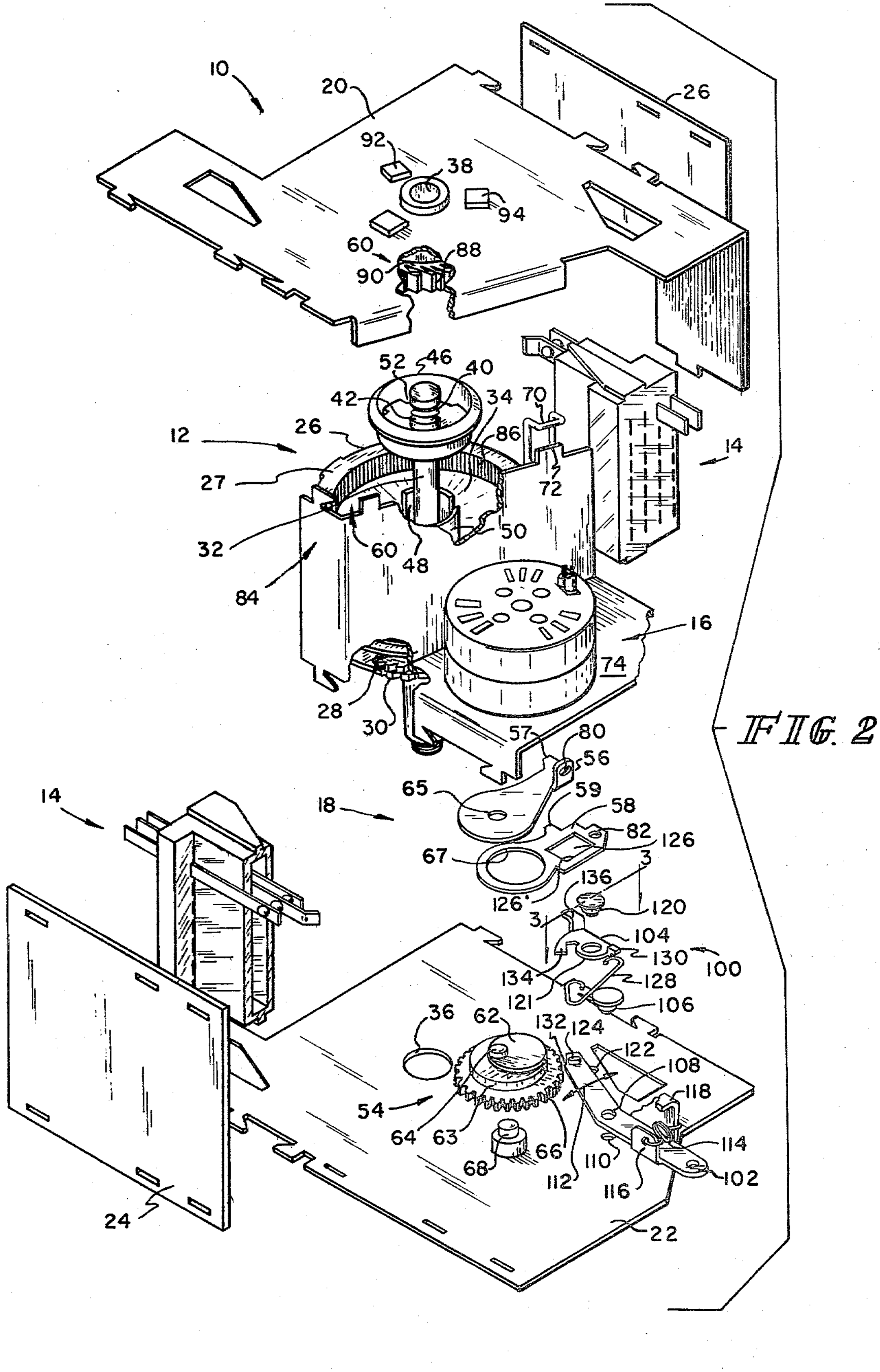
FIG. 2 is an exploded view of the timing mechanism.

Referring now to FIGS. 1 and 2 of the drawings, there is shown a timing mechanism 10 which in general includes a cam means 12, electrical switches 14 which engage and are responsive to the cam means, a motor drive means 16, and an intermittent drive means 18 coupling the motor drive means to the cam means. The timing mechanism is enclosed within a housing which includes end plates 20 and 22 and side walls 24 and 26. Cam means 12 includes a series of cam tracks 26 unitarily constructed to provide an outer shell 27 and a pair of ratchets 28 and 30 which are also integrally constructed with the outer shell. The outer shell with the cam tracks is rotatably carried about a shaft 32 through web 34. The shaft is rotatably journalled in end plate 22 through aperture 36 and in end plate 20 through aperture 38. The shaft, and thus the cam means, is axially displaceable and can be held in one of two positions through the cooperation of detents 40 and 42 and spring 44 (FIG. 1). A line switch actuator 46 is coupled to the cam means through tongues 48 of sleeve 50 engaging slots 52 of the actuator. Axial indexing of the shaft causes a line switch (not shown) to be opened or closed to remove or apply electrical power to the timing mechanism.

What has been described thus far is well known in the art of timing mechanisms and does not form part of the present invention.

The present invention is concerned with intermittent drive means 18. Such drive means will, as previously noted, provide multiple programs and greatly increased program capacity in addition to a positive no-back system not usually found in pawl and ratchet systems. In general the intermittent drive means includes ratchets 28 and 30, eccentric drive means 54, a pair of spring biased pawls 56 and 58 and no-back clutch means 60.

Eccentric drive means 54 includes a drive disc 62 and post 64 carried by disc 62, the disc 62 being carried by gear 66 through land 63. Land 63 serves as a "height adjustment" for the assembly. Gear 66 is journalled for rotation about post 68 and has its axis of rotation through its center. As shown the axis of rotation of disc 62 is off center. Gear 66 is driven at a constant speed of rotation by motor drive means 16 through a motor output pinion (not shown) engaging the gear.

Pawl 56 rides on the surface of disc 62 and is driven by post 64 through aperture 65. Pawl 58 rides on the surface of land 63 and is driven by disc 62 through aperture 67. Pawl 56 engages ratchet 28 through tooth 57 while pawl 58 engages ratchet 30 through tooth 59. The pawls are held in working relationship to each other and with the ratchets 28 and 30 through U-shaped spring 70. Spring 70 is carried by tang 72 which extends from motor frame 74. The ends 76 and 78 of the spring, as best shown in FIGS. 2 and 3A are bent over to be held in apertures 80 and 82 of the pawls. As will be described more completely hereinafter, motor drive means 16 rotates gear 66 at a constant speed which in turn rotates eccentrics 62 and 64 to intermittently drive cam means 12 through ratchets 28 and 30. By properly synchronizing the eccentrics 62 and 64 with respect to each other and by changing or altering their relationship as occasion demands an almost infinite number of time sequences or programs can be achieved.

However, in order to more effectively utilize the two drive pawl arrangement, it has been found that an improved no-back system over the conventional pawl no-back system needed to be provided. More specifically, a conventional pawl no-back system which relies on a pawl engaging a ratchet or a gear inherently has a certain amount of back lash or lost motion, and in addition, because the pawl engages a gear being driven by a drive pawl, the system is inherently limited to the number of time sequences it can handle. In accordance with the present invention these problems are overcome by no-back clutch 60 which includes ratchet teeth 86 and a multiplicity of pawls 88 engaging the ratchet teeth. As shown in FIGS. 1 and 2 ratchet teeth 86 are internal teeth formed integral with outer shell 27 of cam means 12 to be rotatable therewith. Pawls 88 are carried on a rim 90 which is fixed to plate 20 through tangs 92 engaging apertures 94 of the plate. As cam means 12 is intermittently rotated by drive pawls 56 and 58, back lash is prevented by the engagement of a pawl with a ratchet tooth. And since the combination of the ratchet teeth and the pawls covers substantially 360° of rotation, engagement of a pawl with a tooth upon any start of a backlash by the cam means is almost instantaneous. Thus there is substantially no lost motion in the system.

There may be occasions when the operator of an appliance such as a clothes washer, does not need or desire all of the programs available with the present timing mechanism. To this end, there is provided a means 100 for disengaging one of the pawls 56 or 58 from engagement with their respective ratchets 28 or 30. In the present invention the means 100 removes pawl 58 from engagement with ratchet 30. Means 100 includes a spring biased lever 102 and spring biased actuator 104. Lever 102 pivots about post 106 on plate 22 the post extending through aperture 108 and engaging aperture 110. The post pivots in the direction shown by arrow 112. The lever is spring biased to be able to return to its starting position by coil spring 114, the spring being coupled to plate 22 through tang 116 extending from the lever and tang 118 extending from the plate. Actuator 104 pivots about post 120 on plate 22, the post extending through apertures 121 and engaging aperture 122 in plate 22. A post 124, extending from lever 102, extends into aperture 126 of pawl 58. The actuator is spring biased with respect to lever 102 by spring 128, the spring being coupled to the actuator at one end through tab 130 and to the lever at the other end through post 124.

To disengage pawl 58 from ratchet 30, lever 102 is manually activated to pivot the lever clockwise. Post 124 engages a side 126' of aperture 126 to disengage pawl 58 from ratchet 30. In addition, tab 134 of the actuator engages a notch 132 of lever 102 to hold the pawl in the disengaged position. As will next be described, the pawl is maintained in the disengaged position until released by tab 136 of the actuator engaging an enlarged tooth or lug of gear 30.

Figure 3C:
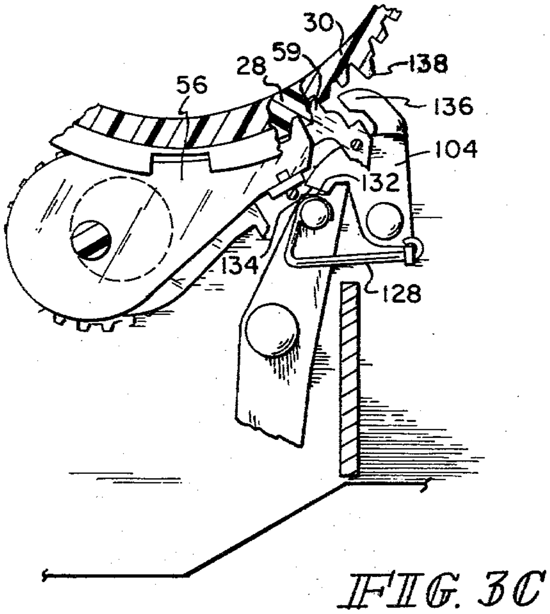
FIGS. 3A-3E are views taken along the line 3—3 of FIG. 2 showing different operating modes of the timing mechanism.
Figure 3A:
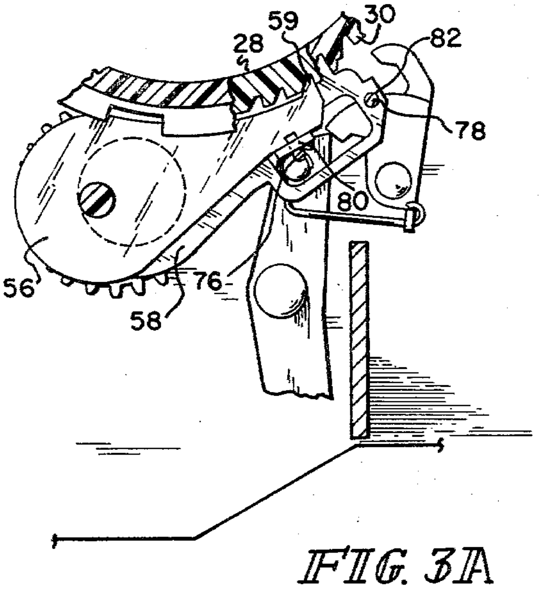
Figure 3B:
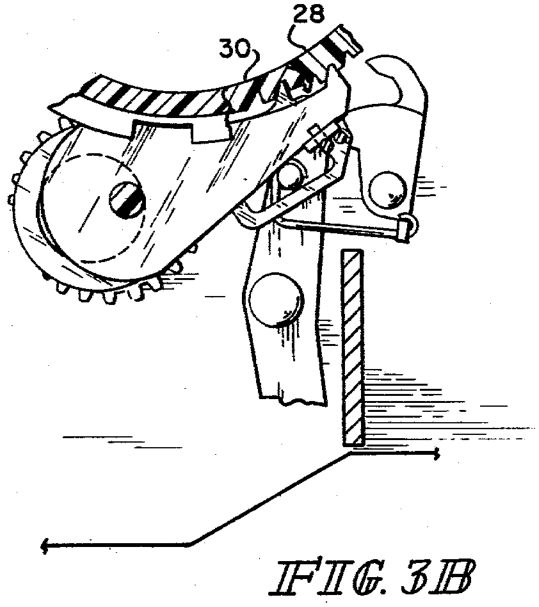

Referring now to FIGS. 3A–3E, FIGS. 3A and 3B illustrate the conditions when both drive pawls 56 and 58 are in use. In FIG. 3A pawl 58 operating from eccentric 62 (FIG. 2) has advanced ahead of pawl 56. In FIG. 3B the relationship of the pawls is 180° from the condition of FIG. 3A. That is, pawl 56 operating from eccentric 64 has advanced ahead of pawl 58.

Figure 3D:
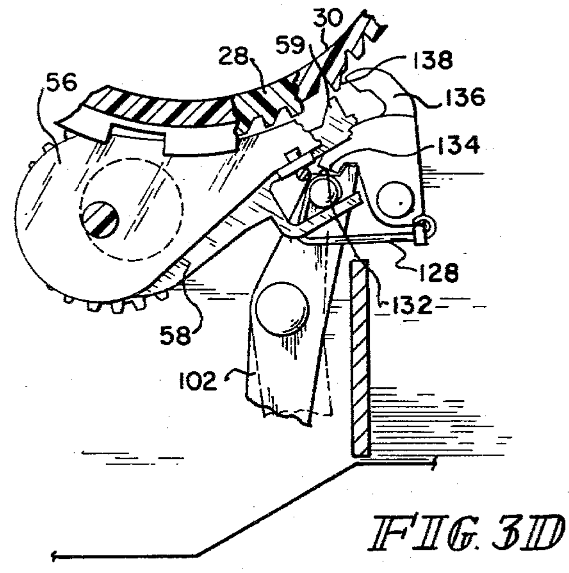
Figure 3E:
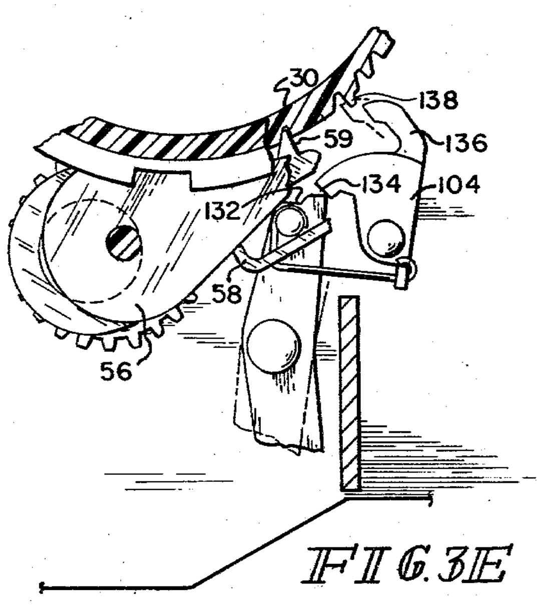

In FIGS. 3C through 3E, pawl 58 is disengaged from ratchet 30 to eliminate cycles of the overall program (short cycle) of the timing mechanism. In FIG. 3E there is shown a condition wherein a short cycle has been completed. Lug 138 of ratchet 30 is engaging tab 136 as the ratchet rotates with the power driven rotation of cam means 12 to pivot actuator 104 to disengage tab 134 from notch 132 to permit tooth 59 of pawl 58 to engage a tooth of ratchet 30. In FIG. 3C, lug 138 has been manually moved past lug 136 through manual rotation of cam means 12. Tooth 59 still remains engaged. From this position lever 102 can be pivoted to disengage tooth 59 from ratchet 30 in the manner previously described. From this position (tooth 59 disengaged) cam means 12 is intermittently rotated through pawl 56 only until the position of FIG. 3D is reached wherein lug 138 is about to engage tab 136 to achieve the position of FIG. 3E.

What is claimed is:

1. In a timing mechanism wherein a cam means is rotatably driven by power drive means through an intermittent drive means, an improvement characterized by said intermittent drive means comprising:

(a) first and second ratchet means coupled to said cam means, (b) first and second drive pawls coupled to said power drive means engaging said first and second ratchet means respectively, (c) a no-back clutch operably associated with said cam means preventing reversal thereof during its advancement, and (d) disengaging means to disengage one of said drive pawls from said cam means and to hold said one drive pawl in disengagement for at least a portion of a program of said timing mechanism.

2. In a timing mechanism according to claim 1 wherein said no-back clutch comprises an annular member having a multiplicity of individual pawls engaging a multi-tooth ratchet coupled to said cam means.

3. In a timing mechanism according to claim 2 wherein said annular member is carried by a housing member of said timing mechanism and wherein said multi-toothed ratchet includes internal teeth carried by said cam means.

4. In a timing mechanism according to claim 1 wherein at least one of said first and second drive pawls is coupled to said power drive means through an eccentric.

5. In a timing mechanism according to claim 4 wherein both said first and second drive pawls are coupled to said power drive means through an eccentric.

6. In a timing mechanism according to claim 5 wherein said first and second drive pawls are independently biased to engage said cam means through a separate spring means.

7. In a timing mechanism according to claim 1 wherein said disengaging means includes a spring biased lever and a spring biased actuator coupled to said spring biased lever and engaging said one drive pawl and said cam means.

8. In a timing mechanism according to claim 1 wherein said disengaging means includes:

(a) a spring biased lever, pivotly mounted on a plate of a housing for said timing mechanism, a post carried at an end of said lever, and a tab extending from said end providing a notch therein, (b) an actuator pivotaly mounted on said plate including a first tab engaging said notch, and a second tab engaging said cam means, and, (c) a spring connected to said post and said actuator.

* * * * *